United States Patent [19]

Neilson et al.

[11] Patent Number: 5,000,570
[45] Date of Patent: Mar. 19, 1991

[54] OPTICAL SYSTEM FOR STAGGER COMPENSATION IN AN OPTICAL SCANNER

[75] Inventors: Peter J. Neilson, Stroud; Anthony G. Bach, Woldingham, both of England

[73] Assignee: Itek Graphix Corp., Waltham, Mass.

[21] Appl. No.: 385,494

[22] Filed: Jul. 26, 1989

[30] Foreign Application Priority Data

Aug. 16, 1985 [EP] European Pat. Off. ............ 88307585

[51] Int. Cl.$^5$ .......................... G01J 3/06; G01N 21/25
[52] U.S. Cl. ....................................... 356/308; 358/75
[58] Field of Search ............... 356/418, 419, 380, 398, 356/406, 416, 308; 358/75, 42; 250/236, 221

[56] References Cited

U.S. PATENT DOCUMENTS 4,851,899 7/1989 Yoshida et al. .................. 358/75

FOREIGN PATENT DOCUMENTS 2811021 9/1978 Fed. Rep. of Germany .
3203796 9/1982 Fed. Rep. of Germany .
3412723 10/1985 Fed. Rep. of Germany .
1600005 10/1981 United Kingdom .

Primary Examiner—Vincent P. McGraw
Assistant Examiner—LaCharles P. Keesee
Attorney, Agent, or Firm—Morgan & Finnegan

[57] ABSTRACT

An optical scanner is provided wherein each waveband, i.e. blue, green and red, is detected during successive revolutions of an analyzing drum. A variable scanning aperture disc selectively transmits a different image portion during each waveband scan so that the image portion detected during each waveband scan is transversely displaced along the axis of the analyzing drum. The transverse distance of optical image portion displacement corresponds to and corrects for the transverse distance travelled by the optical scanning head during one revolution of the analyzing drum. Magnification optics are also provided for, inter alia, adjusting the transverse displacement of the image portions.

29 Claims, 3 Drawing Sheets

OPTICAL SYSTEM FOR STAGGER COMPENSATION IN AN OPTICAL SCANNER

TECHNICAL FIELD

The present invention relates to an optical system for a color separation scanner and, more particularly, to an improved optical system capable of compensating for stagger introduced during scanning.

BACKGROUND AND OBJECTS OF THE INVENTION

Color separation scanners are used to scan original artwork and separate the image into individual color components, i.e. blue, green and red wavebands. The resulting data for the blue, green and red wavebands is most commonly used to produce monochrome halftone separation images on separation films. The monochrome separation films are subsequently used to make printing plates, usually for four color printing with traditional yellow, magenta, cyan and black process inks. Of course, continuous and halftone separation films may be made and used in other processes.

In particular, the present invention pertains to color scanners of the type generally disclosed in United Kingdom patent number 1,600,005 issued to Neilson and Pickering entitled "Improvements In Or Relating To Electro-Optical Scanning". In the scanner there disclosed, reflective or transparent artwork containing an image to be analyzed is mounted on a rotating analyzing drum. An image point on the original artwork is illuminated with focused light from a light source and analyzed as the analyzing drum rotates at high speed with the scanning head advancing transversly across the surface of the drum at a slower speed. Each image point is scanned three times during successive rotations of the drum to obtain density data for the three separate wavelength band components, i.e. blue, green and red, necessary to make yellow, magenta, cyan and black separation films.

The foregoing type of scanner, wherein three successive drum rotations are used to detect three waveband components of an image point, advantageously permits use of a single detector to sense all wavebands. This eliminates the need for color drift compensation between detectors and reduces scanner cost.

Theoretically, three rotations of the analyzing drum are completed prior to advancing the scanning head so that blue, green and red density data is collected from identical points on the original image. It has been found, however, that the simultaneous rotation of the analyzing drum and transverse movement of the scanning head result in misalignment of the blue, green and red images detected for any given point on the original image. In other words, by the time each successive drum rotation is complete the scanning head has advanced slightly, e.g. one third of a pixel, in the longitudinal direction along the drum. Consequently, the blue, green and red images are not in accurate alignment for each image point, and the resulting blue, green and red waveband density data do not correspond precisely for each image point. This causes, among other things, undesirable color fringing at detail edges and increased signal noise.

Therefore, it is one object of the present invention to provide a color scanner wherein all waveband images corresponding to a given image pixel are in optical alignment.

It is a further object of the present invention to provide a scanning color head for a color scanner having a rotating drum, wherein all waveband images corresponding to a given image pixel are in optical alignment.

Another object of the invention is to provide a color scanner that is not susceptible to color fringe effects.

Another object of the invention is to provide a color scanner with improved signal noise.

These and other highly desirable and unusual results are accomplished by the present invention in an economical, reliable and compact color scanner optical system.

Objects and advantages of the invention are set forth herein and in part will be obvious herefrom, or may be learned by practice with the invention, the same being realized and attained by means of instrumentalities and combinations pointed out in the appended claims.

The invention consists of the novel parts, constructions, arrangements, combinations, steps and improvements herein shown and described.

SUMMARY OF THE INVENTION

In accordance with the invention, an optical scanner is provided having a rotating analyzing drum to receive original transparency or reflective artwork. An image spot on the drum is illuminated and the illuminating light is modulated by the original artwork. The analyzing drum rotates three times so that a single detector can collect blue, green and red waveband data for each image point. The modulated light from the artwork is collected and magnified, if desired, before passing through a fixed scan aperture. A variable scan aperture overlaps the fixed scan aperture and sequentially transmits portions of the image from the fixed scan aperture for detection. Sequential transmission of portions of the image received from the fixed aperture compensates for the stagger introduced during multiple rotations of the analyzing drum as the scanning head simultaneously advances transversely across the analyzing drum.

In the preferred embodiment, the image point on the analyzing drum is illuminated with white light and the modulated image is collected and transmitted to the fixed scanning aperture. The variable scanning aperture consists of three partial circumferential slits in a first, scanning aperture region of a rotating scanning disc. Each of the three partial circumferential slits covers approximately 120° of arc and overlaps a portion of the fixed scanning aperture corresponding to right, center and left image portions. The image portion transmitted by the fixed and variable scanning apertures is collimated and refracted by a color separating prism. The spectrum separated image is folded back onto a second, waveband selection region of the rotating disc having a second set of partial circumferential waveband selection slits. Each waveband selection slit covers approximately 120° of arc and corresponds to one variable scanning slit so that the image portion transmitted by each variable scanning aperture corresponds to one waveband region.

During operation, the disc rotates in synchronization with the analyzing drum at one-third the rotational speed of the analyzing drum. During a first rotation of the analyzing drum the rotating scanning disc executes one-third of a rotation so that one variable scanning aperture transmits a first image portion. The corresponding waveband selection slit transmits one waveband of the spectrum separated image portion for detection by a photomultiplier. During a second rotation of the analyzing drum the rotating scanning disc executes a second third of one full rotation so that a second variable scanning aperture transmits a second image portion. The corresponding waveband selection slit transmits a second waveband region of the spectrum separated image portion for detection. During a third rotation of the analyzing drum the rotating scanning disc executes the final third of one full rotation and the third and final variable scanning aperture slit transmits the third and final image portion for detection. The corresponding waveband selection slit transmits the last waveband region of the spectrum separated image portion for detection. In order to compensate for the transverse movement of the scanning head across the analyzing drum, the selected image portions are each transversely displaced one third of one image point or pixel in the direction opposite to the direction of travel of the scanning head.

In sum, each waveband corresponds to one selected image portion which, in turn, is optically displaced to compensate for the lateral displacement of the optical scanning head after each analyzing drum rotation. In other words, two of the three waveband scans are optically "back-stepped" relative to the preceding waveband scan to ensure that all waveband data for each image point or pixel is accurately aligned, thereby eliminating color fringe and noise effects.

In an alternative embodiment, the same result is obtained with two scanning discs, one to perform waveband selection and a second disc to select image portions for detection. In this embodiment it is contemplated that waveband selection would be performed at the illumination source. Selection of stagger-corrected image portions for detection would be performed after modulation of the waveband separated illumination by the original artwork.

Thus, the present invention advantageously and efficiently obtains stagger compensation by optically adjusting the portion of the image detected during each waveband scan, i.e. during each successive rotation of the analyzing drum, so that all waveband data for each image point is in alignment. Remarkably, these highly desirable results are obtained without adding appreciably to the size, weight or cost of the optical scanner.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate preferred embodiments of the present invention, and together with the description serve to explain the principles of the invention, in which.

DETAILED DESCRIPTION OF THE PREFERRED EMBODIMENTS

Figure 1:
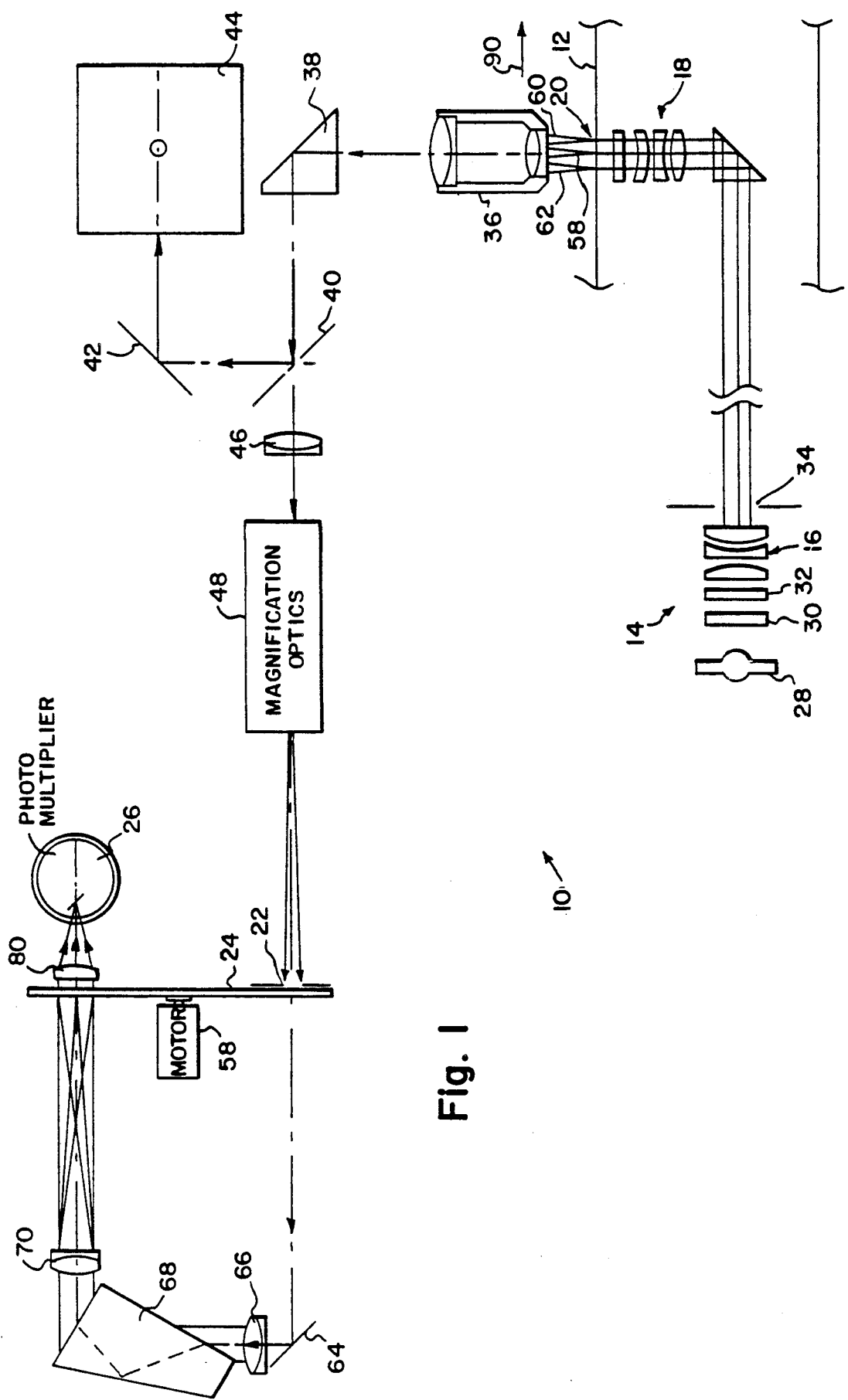
FIG. 1 is an optical schematic diagram of an optical scanner illumination system in accordance with the preferred embodiment of the invention.

Referring now to the drawings, there is shown an optical system 10 for a color scanner having a rotating analyzing drum 12 and an illumination source 14. A beam of light from the source is focused by illumination optics 16, 18 at an illumination spot 20 on the surface of the drum to illuminate an image point on original artwork (not shown) placed on the drum. It should be understood that although a transmission-type illumination system is illustrated herein, it is contemplated that reflection-type illumination could be used for reflective artwork in a known manner. By way of example, the illumination beam might be diverted into a fiber optic cable which delivers light to image spot 20 at an angle to the original artwork, such as in a traditional 45°-90° reflective illumination configuration.

Light from the illuminated image spot 20 is transmitted through a fixed scanning aperture 22 and a variable scanning field aperture, such as a rotating scanning disc 24 having stepped spiral slits corresponding to the image portions to be detected Each waveband is sequentially detected by a photomultiplier 26. The waveband data is stored, processed, and used to expose one or more separation films in a known manner.

In the preferred embodiment shown in FIG. 1, the preferred illumination source is a xenon lamp 28. Light from lamp 28 is transmitted through a heat filter 30, an ultraviolet filter 32, a collimating lens 16, and an illumination spot aperture 34 to form a collimated illumination beam parallel to the axis of the analyzing drum. It is contemplated that a variety of spot aperture sizes may be required depending upon the degree of magnification, so aperture 34 should be adjustable. This might be accomplished by providing a rotating wheel having a number of appropriate apertures. It is also contemplated that flood illumination may be desirable for general viewing of the original artwork.

The collimated illumination beam is folded by folding optics 18 and is incident at an image spot 20 on the analyzing drum 12 to illuminate transparency original artwork placed on the drum. Preferably, the illumination spot 20 is slightly larger than the size of the image portion to be analyzed. As previously pointed out, the illumination beam could, in the alternative, be transmitted in a known manner outside the analyzing drum to illuminate non-transparent or reflective artwork mounted on the drum surface.

As shown, light from the illuminated image spot is collected and transmitted by a main objective lens 36 and is folded by a mirrored prism 38. A movable mirror 40 is shown for diverting the image to a fixed mirror 42 and a viewing screen 44. During image analysis, however, movable mirror 40 is removed from the optical path and the image is transmitted through a corrector lens 46 to magnification optics 48. Magnification optics 48 may, for example, consist of a lens turret equipped with various lens configurations to provide a number of different magnifications. The magnified image is transmitted to fixed scan aperture 22, which may be on the order of 0.053 inches by 0.088 inches.

Rotating disc 24 has a first, image selection region provided with three partial circumferential field aperture variation slits, each having a different radius of curvature and covering approximately 120° of arc. Each aperture variation slit corresponds to one image portion to be detected, the number of image portions coinciding with the number of wavebands to be detected. Typically, three wavebands, i.e. blue, green and red, are detected. Light transmitted by the combined aperture defined by the fixed aperture and the variable field aperture is folded by mirror 64 to collimating lens 66, and the collimated image is refracted by color separating prism 68 into a spectrum separated image. In the preferred embodiment, the spectrum separated image is focused by lens 70 onto a second, waveband selection region of rotating disc 24. The waveband selected image is focused by lens 80 onto photomultiplier 26 for detection.

Figure 2:
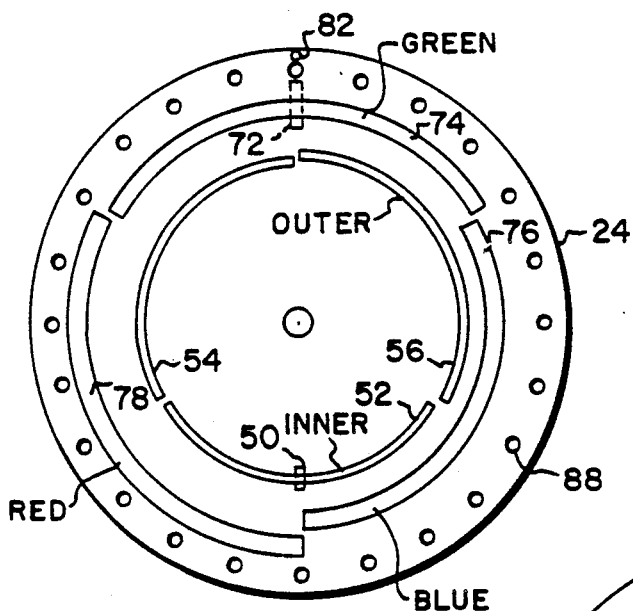
FIG. 2 is an elevation view of a rotating variable scanning aperture and waveband selection disc in accordance with the preferred embodiment of the invention.

Referring now to FIG. 2, an elevation view of rotating disc 24 shown in FIG. 1, a first image region 50 corresponds to the light incident on the disc from fixed aperture 22 and a second image region 72 corresponds to the spectrum separated image focused by lens 70 onto the waveband selection region of the disc.

Referring to first region 50, three partial circumferential slits 52, 54, 56, each covering approximately 120° of arc and having different radii of curvature, are provided for selecting and transmitting a portion of the light received from fixed aperture 22. Thus, inner scan slit 52 overlaps a portion of fixed aperture 22 and transmits a portion of the light received therefrom during one third the rotation period of disc 24. Likewise, each of intermediate scan slit 54 and outer scan slit 56 overlaps a portion of fixed aperture 22 and transmits a portion of the image received therefrom during one third of the period of rotation of disc 24. Preferably, the light transmitted by intermediate slit 54 overlaps and transmits sixty percent of each of the image regions transmitted by slits 52 and 56. Thus, as disc 24 is rotated by motor 58 (see FIG. 1), variable scan slits 52, 54, 56 successively transmit overlapping displaced portions of the image received from fixed scan aperture 22.

The relationship between the image portions transmitted by variable scan slits 52, 54, 56 and the illumination spot 20 on drum surface 12 can be explained in relation to FIG. 1 as follows. Intermediate or center slit 54 on disc 24 transmits light corresponding to an on-axis image portion illustrated as ray diagram section 58. Inner slit 52 transmits light corresponding to a right-hand image portion illustrated as ray diagram section 60, and outer slit 56 transmits light corresponding to a left-hand image portion illustrated as ray diagram section 62.

Referring again to FIG. 2, in a second waveband selection region of rotating disc 24, a second set of partial circumferential slits 74, 76, 78 is provided to select different waveband regions of the spectrum separated image for detection by photomultiplier 26 (see FIG. 1). As shown in the preferred embodiment, the waveband selection slits also cover approximately 120° of arc and are 180° out of phase with the variable scan aperture slits. The waveband selection slits overlap the spectrum separated image represented at numeral 72, and each waveband slit transmits a portion of the waveband separated image for detection. Thus, outermost waveband selection slit 78 corresponds to the red portion of the spectrum separated image incident on the disc, with waveband selection slits 74 and 76 corresponding to the green and blue portions of the spectrum separated image, respectively. In the disc position shown in FIG. 2, the inner variable scan slit 52 overlaps fixed aperture 22 and transmits light corresponding to the right hand image portion 60 of illuminated spot 20. The light transmitted by scan slit 52 is refracted into a spectrum separated image (see FIG. 1) and focused onto the waveband selection region of the disc illustrated at 72. As shown in FIG. 2, the green waveband selection slit 74 transmits the green portion of the spectrum separated image portion for detection.

It will be appreciated from the foregoing discussion that, because light receiving regions 50 and 72 are 180° apart on disc 24, green waveband data will be collected during transmission of the right hand image portion 60 by variable scan slit 52. Likewise, blue waveband data will be collected during transmission of the center image portion 58 by intermediate variable scan slit 54 and red waveband data will be collected during transmission of the left hand image portion 62 by outer variable scan slit 56. During transmission of any given portion of the spectrum separated image the remaining image portions are blocked by the surrounding disc structure, as illustrated in phantom at 72.

It is important that disc 24 rotate in synchronization with the analyzing drum. In the preferred embodiment wherein three wavebands are to be detected, disc 24 should rotate at one third the speed of the analyzing drum so that the analyzing drum completes three full rotations, i.e. one for each waveband, during each rotation of disc 24. To ensure proper synchronization, uniformly spaced clock speed holes 88 are provided on disc 24 in order to monitor the rotational speed and relative position of disc 24 using a traditional electro-optical sensor. A color change marker 82 provides a zero point to indicate the beginning of a disc rotation cycle. A position marker (not shown) is provided on the analyzing drum to indicate a location where no original artwork should be placed. With the analyzing drum and disc properly aligned and driven in synchronization, each color change occurs as the position marker on the analyzing drum passes the illumination spot 20. In this manner, each waveband cycle commences as the position marker unoccupied by original artwork passes the illumination spot.

During operation, image spot 20 is illuminated on the surface of the rotating analyzing drum. Light modulated by original artwork on the drum is collected by objective lens 36 and is optically transmitted, with or without magnification, through fixed scan aperture 22 to variable scan apertures 52, 54, 56 on disc 24. The variable scan apertures determine which portion of the illuminated image spot is selected for detection, thereby permitting correction for the stagger introduced by the continuous advancement of the scanning head transversely across drum surface 12. Thus, with the scanning head moving to the right, i.e. in the direction indicated by arrow 90, the right hand portion 60 of the image spot is first transmitted by variable scan slit 52 for detection. During the next analyzing drum rotation the scanning head has advanced approximately one third of a pixel, and central image portion 58 is transmitted by variable scan slit 54 for detection. Finally, during the third and final analyzing drum revolution the scanning head has advanced yet further, and left hand image portion 62 is transmitted by variable scan slit 56 for detection. In this manner, the misalignment introduced by the scanning head is optically corrected and the same image is transmitted for detection during all three drum rotations. In the preferred arrangement of the variable scan slits and the waveband selection slits on rotating disc 24 (see FIG. 2), the right hand image portion 60 is detected during green waveband selection, the central image portion 58 is detected during blue waveband selection, and the left hand image portion 62 is detected during red waveband selection.

It will be appreciated that the transverse scanning speed of the optical scanning head varies in direct proportion to desired image resolution. However, since magnification optics 48 are adjusted during any change in resolution so as to alter pixel size, that is scanning head speed and magnification are concurrently adjusted to adjust resolution, the stepping distance between image portions 58, 60, 62 is also adjusted. Thus, the degree of magnification optically adjusts the image portion stepping distance to conform to the transverse speed of the optical scanning head.

As a further advantage of the present invention, the configuration of the partial circumferential slits may be varied to compensate for the relative sensitivity of the photomultiplier to each waveband. By way of example only, the intermediate variable scan slit 54 might be wider than the inner variable scan slit 52 in order to increase the intensity of blue waveband light reaching photomultiplier 26, thereby compensating for relatively greater sensitivity of the photomultiplier to green light than to blue light.

Figure 4:
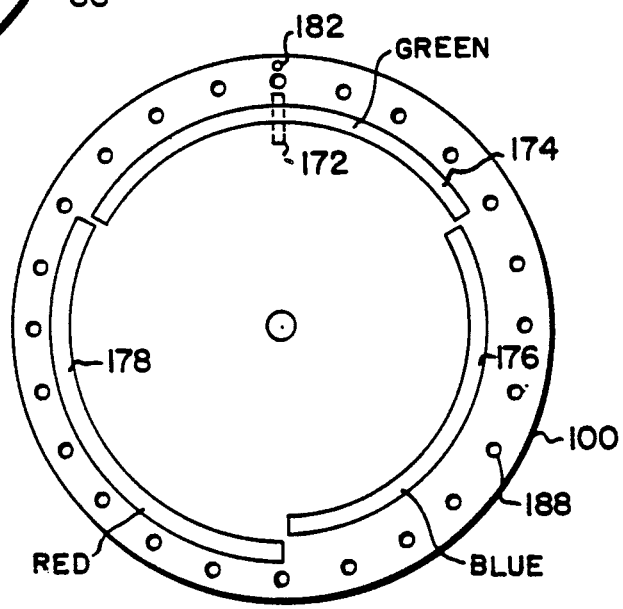
FIG. 4 is an elevation view of a waveband selection disc in accordance with the first alternative embodiment of the invention.
Figure 5:
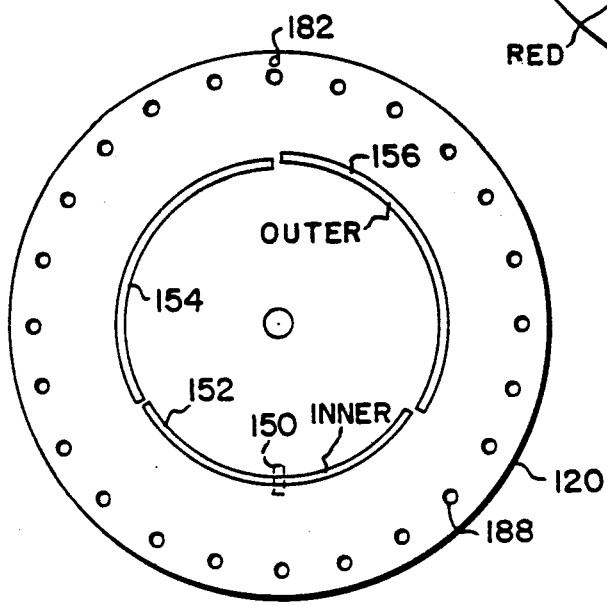
FIG. 5 is an elevation view of a variable scanning aperture disc in accordance with the first alternative embodiment of the invention.
Figure 3:
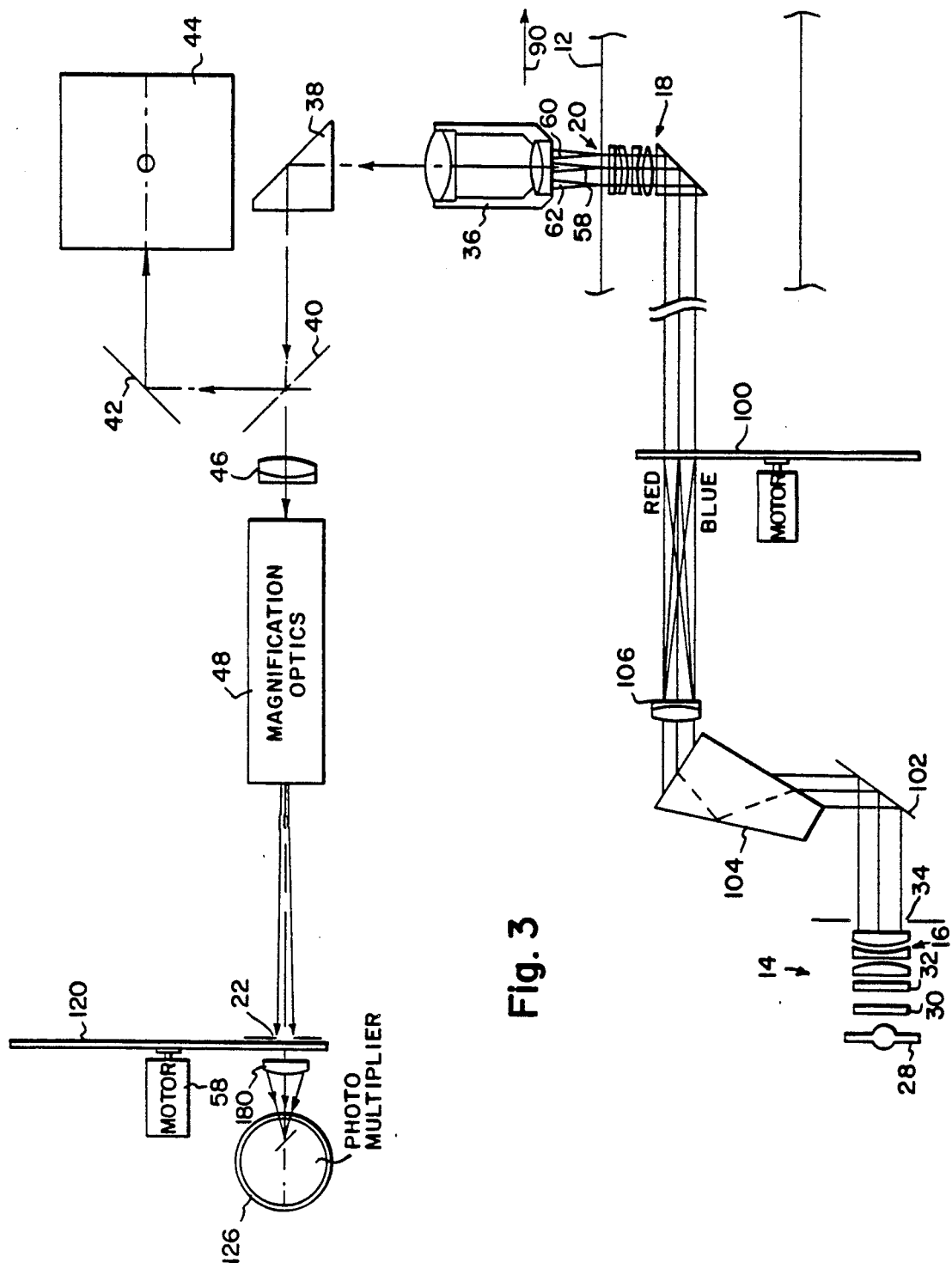
FIG. 3 is an optical schematic diagram of a first alternative embodiment of an optical scanner illumination system in accordance with the invention.

In a first alternative embodiment of the invention, shown in FIGS. 3 through 5 having corresponding numerals referring to common elements, waveband selection may be performed prior to analysis using a separate rotating disc 100 in the illumination path. As shown, collimated light from xenon lamp 28 is reflected by mirror 102 to a color separating prism 104 which refracts the collimated source beam into a spectrum. The spectrum is focused by lens 106 onto waveband selection disc 100, which selects the waveband to be transmitted to illuminate spot 20 on drum surface 12.

FIG. 4, an elevation view of waveband selection disc 100, shows that waveband selection disc 100 is the same as the rotating disc 24 of the preferred embodiment (FIG. 2), except for the absence of any variable scanning aperture slits. Thus, waveband selection slits 174, 176, 178 determine which waveband of light, i.e. blue, green, red, will be transmitted to illumination spot 20. As in the preferred embodiment, the color change marker 182 and clock speed holes 188 ensure proper synchronization with the analyzing drum.

As shown in FIGS. 3 and 5, a second rotating disc 120 having variable scanning slits 152, 154, 156 is provided in the optical path of the image from the magnification optics 48. As in the case of waveband selection disc 100, variable scanning aperture disc 120 is similar to the rotating disc 24 of the preferred embodiment (FIG. 2), except for the absence of any waveband selection slits. Thus, disc 120 includes color change marker 182 and clock speed holes 188 to ensure synchronization with the analyzing drum, and slits 152, 154, 156 respectively transmit the right hand image portion 60, central image portion 58 and left hand image portion 162 during successive analyzing drum revolutions as disc 120 rotates at one third the speed of the analyzing drum. As shown in FIG. 3, light transmitted by disc 120 is focused by lens 180 onto photomultiplier 126 for detection.

As in the preferred embodiment, the combined effect of rotating discs 100, 120 is to select right, center and left image spot portions for separate waveband detection. In either embodiment, the synchronized selection of different image portions for detection during each waveband pass compensates for the displacement in scanning head position during each revolution of the analyzing drum.

Thus, it will be apparent that the stagger compensation optical system according to the present invention advantageously provides an optical system and method for ensuring alignment of all waveband image point data by optically displacing the portion of the image detected during each waveband scan, i.e. each successive rotation of the analyzing drum, by a transverse distance equal to the transverse distance travelled by the optical scanning head during each rotation of the analyzing drum. Surprisingly, this remarkable result is obtained in a light weight, compact structure that does not add appreciable weight, complexity or cost to the scanner.

To the extent not already indicated, it will be understood by those of ordinary skill in the art that any one of the specific embodiments herein described and illustrated may be further modified to incorporate features shown in other of the specific embodiments. In addition, modifications to the structure shown and described herein will no doubt occur to those of ordinary skill in the art. By way of example only, it is contemplated that either or both sets of partial circumferential slits could be replaced by a continuous spiral slit rather than independent slits having different radii. It is also contemplated that a different number of image portions or waveband regions could be used, that the arrangement of wavebands and image portions could be altered, and that multiple scanning discs could be used in the preferred embodiment, wherein both waveband selection and stagger correction are performed subsequent to modulation of light by the artwork. It should also be noted that use herein of terms such as "light", "right", "center" and "left" is merely illustrative and should not be construed as restrictive of the invention.

Therefore, the invention in its broader aspects is not limited to the specific embodiments herein shown and described but departures may be made therefrom within the scope of the accompanying claims without departing from the principles of the invention and without sacrificing the chief advantages thereof.

What is claimed is:

1. An optical scanner comprising:
   an analyzing drum having a circumferential surface to receive original artwork;
   illumination means for transmitting light to scanning source optics moveable transverse to the direction of rotation of said analyzing drum, said light illuminating an image point on said drum surface;
   collection optical means disposed in an optical scanning head movable transverse to the direction of rotation of said analyzing drum, said collection optical means receiving light from said image point;
   variable scanning aperture means disposed in the optical path from said collection optical means, said variable scanning aperture means selectively transmitting for detection light corresponding to portions of said image point for correcting transversely displaced portions of said light;
   spectrum separation means for receiving light from said variable scanning aperture means, separating said light into a spectrum, and selecting a waveband of said spectrum for detection; and a detector for receiving and detecting light from said spectrum separation means, said light corresponding to a waveband selected image portion of said image point.

2. The optical scanner according to claim 1 further comprising a fixed scanning aperture disposed in the optical path adjacent said variable scanning aperture means.

3. The optical scanner according to claim 1 wherein, during successive rotations of said analyzing drum, data corresponding to each image point is detected for at least three wavebands.

4. The optical scanner according to claim 1 wherein said portions of said image point are displaced transversely by a distance corresponding to the transverse distance of travel of said optical scanning head during one revolution of said analyzing drum.

5. The optical scanner according to claim 4 wherein said portions of said image point overlap.

6. The optical scanner according to claim 4 wherein three wavebands are detected, each said waveband corresponding to one image portion.

7. The optical scanner according to claim 6 wherein said variable scanning aperture means further comprise a rotating disc having a variable scanning aperture region provided with three partial circumferential scanning aperture slits, each said scanning aperture slit corresponding to approximately 120° of arc, each said scanning aperture slit having a different radius of curvature.

8. The optical scanner according to claim 7 wherein said spectrum separation means include a color separating prism to receive light from said variable scanning aperture region of said rotating disc, said color separating prism separating said light into a spectrum having at least three wavebands.

9. The optical scanner according to claim 8 wherein the spectrally separated light from said color separating prism is incident upon a waveband selection region of said rotating disc, said waveband selection region being displaced from said variable scanning aperture region, said waveband selection region having three partial circumferential waveband selection slits, each of said waveband selection slits corresponding to approximately 120° of arc, each of said waveband selection slits having a different radius of curvature.

10. The optical scanner according to claim 9 wherein said rotating disc rotates in synchronization with said analyzing drum at one-third the rotational speed of said analyzing drum.

11. The optical scanner according to claim 10 wherein each of said waveband selection slits corresponds to one of said variable aperture slits and receives spectrum separated light corresponding to one of said image portions, whereby, during successive revolutions of said analyzing drum, said rotating disc executes one revolution and said detector receives and detects one waveband of light corresponding to each optically aligned image portion.

12. The optical scanner according to claim 10 further comprising magnification optics disposed in the optical path of said light from said image point to said variable scanning aperture, said magnification optics optically adjusting the transverse displacement between said image portions.

13. An optical scanner comprising:

an analyzing drum having a circumferential surface to receive original artwork;

illumination means for transmitting light to scanning light source optics movable in a direction transverse to the direction of rotation of said analyzing drum, said light illuminating an image point on said analyzing drum surface, said illumination means including waveband selection means for sequentially transmitting different wavebands of illuminating light to said analyzing drum surface during successive rotations of said analyzing drum;

collection optical means disposed in an optical scanning head movable in a direction transverse to the direction of rotation of said analyzing drum, said collection optical means receiving light from said image point on said analyzing drum surface;

variable scanning aperture means disposed in the optical path from said collection optical means, said variable scanning aperture means selectively transmitting for detection light corresponding to portions of said image point for correcting transversely displaced portions of said light; and a detector for receiving and detecting light from said variable scanning aperture means.

14. The optical scanner according to claim 13 wherein said image portions are transversely displaced by a distance corresponding to the transverse distance of travel of said optical scanning head during one rotation of said analyzing drum.

15. The optical scanner according to claim 14 further comprising magnification optics disposed in the optical path between said image point and said variable scanning aperture, said magnification optics optically adjusting the transverse displacement between said image portions.

16. The optical scanner according to claim 14 wherein said waveband selection means sequentially transmits three wavebands during three successive rotations of said analyzing drum.

17. The optical scanner according to claim 16 wherein said variable scanning aperture means further comprise a rotating scanning aperture disc having three partial circumferential scanning aperture slits, each said scanning aperture slit corresponding to approximately 120° of arc, each said scanning aperture slit having a different radius of curvature, each said scanning aperture slit transmitting a different portion of said light received from said collection optical means.

18. The optical scanner according to claim 17 further comprising a fixed aperture disposed in the optical path adjacent to said variable scanning aperture means.

19. The optical scanner according to claim 17 wherein said rotating scanning aperture disc rotates in synchronization with said analyzing drum at one third the rotational speed of said analyzing drum.

20. The optical scanner according to claim 18 wherein said waveband selection means further comprise a color separating prism to receive light from a light source and transmit spectrum separated light to a rotating waveband selection disc, said waveband selection disc having three partial circumferential waveband selection slits, each of said waveband selection slits covering approximately 120° of arc, each of said waveband selection slits having a distinct radius of curvature, whereby each said waveband selection slit transmits one waveband portion of said spectrum separated light to said analyzing drum surface during each revolution of said analyzing drum.

21. The optical scanner according to claim 20 wherein said waveband selection disc rotates in synchronization with said analyzing drum at one-third the rotational speed of said analyzing drum, whereby said image point is illuminated with light from one waveband region during three successive rotations of said analyzing drum.

22. A method of optical scanning comprising the steps of:
illuminating an image point on the surface of a rotating analyzing drum, said analyzing drum surface being configured and dimensioned to receive original artwork;
collecting light from said image point and transmitting said light to variable scanning aperture means;
selectively transmitting through said variable scanning aperture means portions of said light from said image point to correct transversely displaced portions of said image point, said image portions being transmitted during successive rotations of said analyzing drum;
separating light transmitted by said variable scanning aperture means into a spectrum;
selectively transmitting wavebands of said spectrum during successive rotations of said analyzing drum, thereby obtaining waveband selected image portions; and
detecting said waveband selected image portions during successive rotations of said analyzing drum.

23. A method of optical scanning comprising the steps of:
illuminating an image point on the surface of a rotating analyzing drum with distinct wavebands of light during successive revolutions of said analyzing drum;
collecting light from said image point and transmitting said light to variable scanning aperture means;
selectively transmitting through said variable scanning aperture means, during successive revolutions of said analyzing drum, portions of said light from said image point to correct transversely displaced portions of said image point, such that light corresponding to each image portion is transmitted during one revolution of said analyzing drum while said image point is illuminated with one waveband of light, thereby obtaining waveband selected image portions; and
detecting said waveband selected image portions during successive revolutions of said analyzing drum.

24. An optical scanner comprising:
an analyzing surface to receive original artwork;
an illumination means for transmitting light to scanning source optics movable across said surface, said light illuminating an image point on said surface;
a variable scanner aperture means selectively transmitting for detection light corresponding to portions of said image point for correcting displaced portions of said light;
a detector for receiving and detecting light from said variable scanning aperture means.

25. An optical scanner comprising:
an analyzing drum having a circumferential surface to receive original art work;
illumination means for transmitting light to scanning source optics movable transverse to the direction of rotation of said analyzing drum, said light illuminating an image point on said drum surface;
collection optical means disposed in an optical scanning head moveable transverse to the direction of rotation of said analyzing drum, said collection optical means receiving light from said image point;
spectrum separation means for receiving light form said collection optical means, separating said light into a spectrum, and selecting a waveband of said spectrum for detection;
variable scanning aperture means disposed in the optical path from said spectrum separation means, said variable scanning aperture means selectively transmitting for detection light corresponding to portions of said image point for correcting transversely displaced portions of said light; and
a detector for receiving and detecting light from said variable scanning aperture means, said light corresponding to a waveband selection image portion of said image point.

26. The optical scanner according to claim 24 further comprising a fixed scanning aperture disposed in the optical path adjacent said spectrum separation means.

27. The optical scanner according to claim 24 wherein, during successive rotations of said analyzing drum, data corresponding to each image is detected for at least three wave bands.

28. The optical scanner according to claim 24 wherein said portions of said light image point are displaced transversely by a distance corresponding to the transverse distance of travel of said optical scanning head during one revolution of said analyzing drum.

29. A method of optical scanning comprising the steps of:
illuminating and image point on a surface of a rotating analyzing drum, said analyzing drum surface being configured and dimensioned to receive original art work;
collecting said light from said image point;
separating said light into a spectrum;
selectively transmitting wavebands of said spectrum during successive rotations of said analyzing drum, thereby obtaining waveband selective image portions;
selectively transmitting through a variable scanning aperture means portions of said light from said image point to correct transversely displaced portions of said image point, said image portions being transmitted during successive rotations of said analyzing drum; and
detecting said wave band selected image portions during successive rotations of said analyzing drum.

* * * * *